Figure 1:
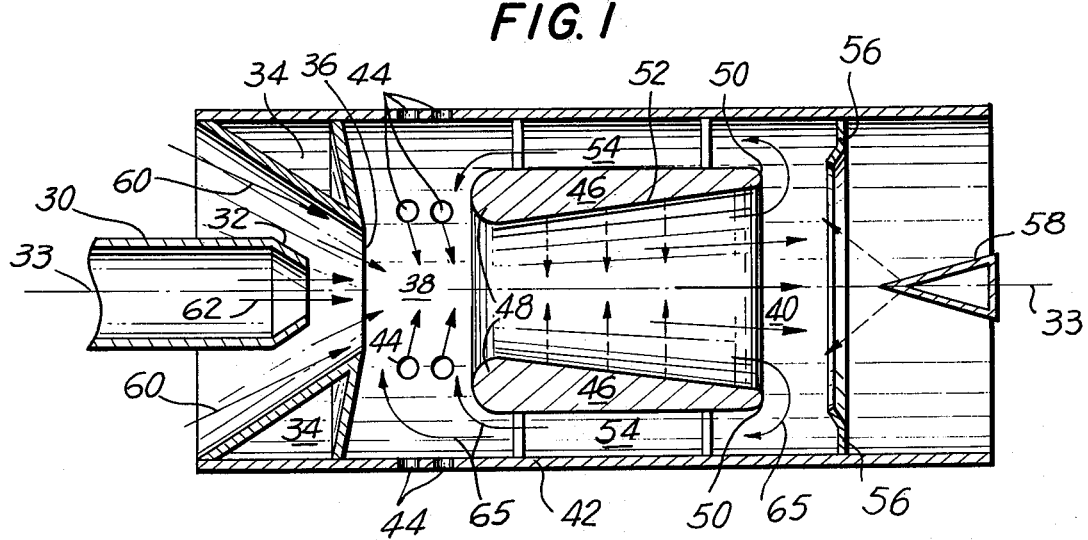

United States Patent [19]
Teller

[11] 3,899,923
[45] Aug. 19, 1975

[54] TEST PROCESS AND APPARATUS FOR TREATMENT OF JET ENGINE EXHAUST

[75] Inventor: Aaron J. Teller, Great Neck, N.Y.

[73] Assignee: Teller Environmental Systems, Inc., Worcester, Mass.

[22] Filed: May 13, 1971

[21] Appl. No.: 143,066

[52] U.S. Cl. .................. 73/116; 60/39.5; 181/33 HC
[51] Int. Cl. ..................... G01m 15/00; F01n 33/04
[58] Field of Search ............ 73/116, 117.1; 60/317, 60/318, 319, 310, 93, 94, 39.5; 181/33 HC; 239/129, 265.17, 39.58, 264

[56] References Cited
UNITED STATES PATENTS

| | | | |
|---|---|---|---|
| 3,205,705 | 9/1965 | Talley | 73/116 |
| 3,327,480 | 6/1967 | Gunter | 60/264 X |
| 3,369,361 | 2/1968 | Craig | 60/39.5 |
| 3,684,054 | 8/1972 | Lemmerman | 181/33 HC |

FOREIGN PATENTS OR APPLICATIONS

| | | | |
|---|---|---|---|
| 865,421 | 4/1961 | United Kingdom | 181/33 HC |

*Primary Examiner*—Jerry W. Myracle
*Attorney, Agent, or Firm*—Thompson, Birch, Gauthier & Samuels

[57] ABSTRACT

A process and apparatus for treating the exhausts of jet engines being tested on jet test stands is shown. A jet or spray of water is introduced to the surface of the exhaust stream serving at once to augment the exhaust and cool it. Substantially less augmentation air is therefore required to absorb the energy of the exhaust, the load on downstream pollution abatement equipment is lessened and the treated exhaust is at least partially condensible. In a preferred embodiment a portion of the exhaust gases that have been partially cooled by air and water augmentation are recycled and remixed with fresh exhaust gases and fresh augmentation air. This internal augmentation results in a decrease in external air augmentation. Also the recycle stream contains some unvaporized water which vaporizes under the conditions at the point of mixture. More efficient use of the augmentation water is thereby achieved with a further reduction in total flows. The augmentation apparatus in which the recycle is achieved comprises an augmenter shell having an annular inner shell having a diverging inner surface.

35 Claims, 2 Drawing Figures

INVENTOR.
AARON J. TELLER

TEST PROCESS AND APPARATUS FOR TREATMENT OF JET ENGINE EXHAUST

This invention relates to a process and an apparatus for treating the hot exhaust gases from jet engines and more specifically to a process and apparatus for treating the exhausts from engines being tested on test stands. Even more specifically, this invention relates to a process and an apparatus for relieving the kinetic energy of the jet engine exhaust by induction of an augmenting air stream and introduction of a vaporizable liquid into the hot gases.

In the conventional testing of jet engines on jet test stands, the hot exhaust gases from the operating engine entrain air from the atmosphere surrounding the exhaust stream and transfer to the entrained air flow a portion of their kinetic energy. The induced air stream, referred to generally as augmentation air, dilutes and cools the jet exhaust stream thereby preventing damage to the jet test cell. In typical testing operations, the amount of augmentation air induced by the exhaust flow, ranges from two to four times that of the jet exhaust for turbojets with afterburners and from one half to two times the mass of the jet exhaust for fan jets. The combined stream of cooled jet engine exhaust and augmentation air is then passed to equipment such as scrubbers, precipitators and the like. In this equipment, the solid particles in the exhaust flow are removed and the noxious gases are absorbed.

As jet engines have grown in size, the difficulty of treating the exhaust gases to remove the pollutants therein has increased more than proportionately. The imposition of higher standards of air pollution control by governmental authorities in recent years has made more effective removal of pollutants from the exhaust stream a necessity. The extremely large volumes of gas that must be handled in the pollution abatement equipment downstream of typical jet test stands using air augmentation require very substantial capital investments and operating costs if pollution control standards are to be met. Thus the increase in engine size coupled with the more stringent air pollution standards has made many jet test stands obsolete, and has placed unsafe or inefficiently high loadings on existing equipment.

It is thus the primary object of this invention to provide a process and an apparatus for treating the hot exhaust from a jet engine operating on a test stand.

It is a further and related object of this invention to provide a process and an apparatus for treating the hot exhaust from a jet engine in such a way that the excessive flows of gas encountered in conventional augmentation processes are not encountered.

It is a further and related object of this invention to provide a process and an apparatus which permits the preparation of the hot exhaust gases for further treatment in pollution abatement equipment.

It is yet a further object of this invention to provide a process and an apparatus for augmenting hot jet engine exhausts while nevertheless maintaining satisfactory engine stability and protecting the jet test cell from excessive temperatures and unsteady flow conditions.

It is a final object of this invention to provide a process and apparatus whereby the existing jet test stand may be used with larger engines without overloading the existing equipment and its associated pollution abatement equipment.

It is a final object of this invention to abate the considerable noise energy developed by conventional jet test cells.

These and other objects of this invention are achieved in a process for treating the hot exhaust gases from a jet engine test stand comprising the step of introducing a liquid in fine particulate form into the hot exhaust gases. The liquid should be vaporizable at the temperature of the hot exhaust. The preferred liquid is water, primarily because of its ready availability and its physical properties. Desirably the water or other liquid is introduced as a jet onto the surface of the cone of hot exhaust gases. In a preferred embodiment, described further below, the vaporizable liquid is introduced together with augmentation air into the hot exhaust gases at an upstream mixing zone and the quantity of augmentation air needed to be introduced to make up the total augmentation fluid is minimized by recycling a portion of the mixed downstream gas to the upstream mixing zone.

In the preferred embodiment of the present invention described below in connection with the drawings, water in a jet or spray is introduced into the stream of hot jet engine exhaust in a mixing zone, in an amount of from 0.05 to 1.5 pounds per pound of exhaust flow together with augmentation air in from 0.1 to 1.2 pounds per pound of exhaust flow. The engine exhaust gases are thereby reduced by combination with the water and augmentation air to a temperature of about 110°–200°F. Desirably, the thusly cooled engine exhaust stream is passed through an apparatus described below in connection with the drawings, and a portion of the cooled gases are recycled back to the mixing zone. If desired, supplementary quantities of water or other vaporizable liquid may be introduced into the cooled gas passing through the apparatus of this invention in order to further reduce the temperature. The final cooled gases are passed to gas scrubbers or other pollution abatement equipment for removal of the particulate pollutants therein.

The introduction of a vaporizable liquid, such as water, into the hot jet exhaust stream serves multiple purposes. Firstly, the liquid water is vaporized at the high temperatures of the exhaust stream and the steam which is formed replaces a portion of the air mass which ordinarily would have to be induced in conventional augmentation processes. Thus, there is a net substitution of a condensible augmentation fluid for the air which would otherwise be used. Secondly, the liquid in vaporizing at the high temperatures of the jet exhaust stream removes a very considerable amount of sensible heat from the jet exhaust, thus lowering its temperature. As a primary object of this invention is the cooling of the jet exhaust gases to avoid damage to the jet test cell, the introduction of the water efficiently accomplishes this objective. Although, in conventional jet test cells, water is now introduced to cool the gases, it is introduced downstream of and subsequent to the air mixing and accordingly has no significant effect on the degree of augmentation. Furthermore, the water is generally introduced in the main body of the gas thus causing flow disturbances. These disturbances can in turn cause instability in engine performance and as a result, the degree of augmentation must be increased in order to maintain engine stability.

Finally, the water vapor in the cooled exhaust stream, because it is a condensible vapor, can be readily removed by condensation from the cooled exhaust stream in the preliminary operations of a pollution control system, and thus the volume of the gas to be handled by the pollution control equipment can be substantially reduced. This is most important in adapting existing jet test cell equipment for use with larger jet engines.

In the preferred process and apparatus of this invention, the hot exhaust gases from a jet engine test stand are introduced into the converging section of a first shell which has an enlarged diameter upstream end open to the atmosphere end in an annular zone surrounding the jet engine exhaust and a reduced diameter downstream end leading to a mixing zone. The high velocity flow of exhaust gases into the converging first shell induces a flow of augmentation air around the core of the exhaust stream at the upstream end of the first shell, and, by creating a low static pressure also induces an internal recycle stream of cooled gases and unvaporized water thus reducing the amount of external augmentation. The combined augmentation air and exhaust stream pass through the first shell into the mixing zone. A jet or spray of water is introduced into the mixing zone. Partial vaporization of the water takes place in the mixing zone and the cooled mixture of exhaust gas, induced air and water vapor passes into an augmenter zone which comprises a tubular outer shell and a substantially concentric tubular inner shell. The inner shell is somewhat shorter in length than the outer shell and has an inner surface which diverges outwardly from the central axis common to both of the tubular shells. The cooled mixture of exhaust gas, induced air and water vapor passes into the diverging inner sheel and a portion of the mixture which passes from the inner shell is recycled through the annular space between the shells back to the mixing zone. It has been found that with the apparatus of this invention which achieves the recycle of a portion of the cooled gases bearing unevaporated water a considerably more efficient overall augmentation process is achieved.

The apparatus and process of this invention are further described in connection with the drawings and in the examples. In the drawing:

FIG. 1 is a simplified, cross-sectional view of the preferred apparatus of this invention embodying a preferred process according to this invention.

In FIG. 1, reference numeral 30 refers to a jet engine having an after section 32. Jet engine 30 is supported on a jet test stand which is not shown. It is horizontally positioned and is coaxial with the central axis 33 of first shell 34. Downstream end 36 of shell 34 leads to a mixing zone 38 and an augmenter zone 40. The apparatus of FIG. 1 incldues an outer cylindrical shell 42 common to both mixing zone 38 and augmenter zone 40. Shell 42 may be of any material suitable to withstand the temperature and velocities of the jet exhaust and typically is of alloy steel construction. A plurality of water jet nozzles 44 are located about the surface of the cone of the stream passing through the downstream end 36 of first shell 34. These may be of any suitable design or configuration; it is their function to furnish a fine spray of water onto the surface of the core of exhaust gases and augmentation air or to direct high velocity jets of water radially into the core of exhaust gases and air.

Downstream of mixing zone 38 is an inner tubular shell 46 supported by struts which are shown but not numbered. Tubular shell 46 is shorter in overall length than outer shell 42 and is positioned in substantially annular relation to outer shell 42. It extends from an upstream position 48 just downstream of mixing zone 38 to a position 50 nearer the downstream end of shell 42. The thickness of shell 46 is greater at its upstream end and accordingly the inner surface of shell 46 diverges outwardly from the common central axis 33 of first shell 34 and shells 42 and 46. This diverging surface is designated by reference numeral 52. Inner shell 46 and outer shell 42 form, between them, an annular zone 54.

Downstream of inner shell 46, and at the inner surfaces of outer shell 42 is at least one annular baffle 56. These baffles are not essential; however, their emplacement in the position shown has a beneficial effect on the recycling of partially cooled exhaust flow. Still further downstream in augmenter zone 40, and coaxial with central axis 33 is conical core buster 58 which disintegrates the core of exhaust gases passing through the apparatus. Use of a core buster is optional depending largely on the effectiveness of the penetrating sprays. Core buster 58 may have spray means associated with it as is shown schematically in FIG. 1.

In operation, the hot exhaust gases leaving the after part 32 of jet engine 30 are introduced into the converging section of first shell 34. The high velocity flow of gases creates a low pressure zone at the downstream end 36 of first shell 34 and thereby induces a flow of augmentation air through the annular space defined by first shell venturi and the after part 32 of engine 30. The stream of augmentation air is designated by reference numeral 60. The mixed stream of induced augmentation air 60 and jet engine exhaust, designated by reference numeral 62, passes through the downstream end 36 of first shell 34 and into mixing zone 38. Water jets are introduced into the core of mixed gases passing through the mixing zone via nozzles 44. The mixture of jet exhaust, augmentation air and water, the latter being partially vaporized passes into augmenter zone 40. As the partially cooled exhaust passes through the confines of inner shell 46 a further fine particulate spray of water may be introduced into it via supplementary spray means indicated schematically on FIG. 1. A portion of the cooled, mixed gases leaving the end 50 of inner shell 46, passes around end 50 and through the annular zone 54 between the inner and outer shells. This recycle flow is indicated by reference numeral 65.

The motive force causing a portion of the gases to recycle back to the mixing zone through annular zone 54 is the pressure differential between the downstream end of the diverging zone of inner shell 46 and the reduced pressure at the mixing zone 38. By adjusting the degree of divergence of inner surface 52 of inner shell 46 and the dimensions of the annular space 54 between the inner and outer shells, it is possible to control, within limits, the amount of gases recycled to the mixing zone. Since the pressure conditions in augmenter zone 40 depend on the diameter of the outer shell, the diameter of the inner shell, the degree of divergence of the inner shell, the volume and velocity of the exhaust gases, augmentation air and water spray and other characteristics, is it not possible to exactly quantify the geometrical relationships which must be obtained in order to achieve a certain degree of recycle. It has been found, however, that it is desirable to recycle from 5 to 50 percent of the total gases passing through the downstream end of inner shell 46 back to the mixing zone. In this way, unvaporized water in the gases passing out of the inner shell is intermixed with fresh exhaust gases and more efficient use is made of the water. This in turn results in a decreased flow of augmentation air and achieves the several stated objects of this invention.

Although it is difficult to establish the exact geometry of first shell 34 and the augmenter zone, it has been found that the angle of convergence of the first shell is preferably from 15° to 45°. This is the angle between the central axis 33 and the converging inner surfaces of first shell 34.

Desirably, the diameter of downstream end 36 of first shell 34 is from 1 inch to 15 inches greater than the maximum flame diameter of the jet engine exhaust. This provides a sufficient annular space through which augmentation air 60 can be induced. Means may be provided to change the position of jet engine 30 along axis 33 so that different operating characteristics can be achieved or means may be provided to modulate the angle of the converging section of the first shell to achieve an optimum ratio with respect to the diameter of the jet exhaust.

It has been found that the water jets introduced via nozzles 44 into mixing zone 38 are preferably introduced radially and uniformly around the circumference of the core of exhaust. Preferably the spray is introduced at an angle of from 0° to 30° downstream of the vertical axis. The spray means may be, for example, a circular pipe having uniformly spaced holes drilled in its inner circumference at angles of from 0° to 30° to the vertical. Alternatively, the spray means may be nozzles oriented uniformly around the surface of the exhaust cone. Broadly, the spray is introduced into the exhaust stream at a rate of from 20 to 200 feet per second.

In order to achieve the recycle of gases around the inner shell 46 and through annular zone 54 in the amounts discussed above it has been found that the angle of divergence of the inner surface of shell 46 from the horizontal axis should be from 4° to 15°. Preferably, the angle of divergence ia about 7°. As shown in FIG. 1, the forward and rear most surfaces 48 and 50 respectively of inner shell 46 are rounded in order to provide a smooth aerodynamic surface to the exhaust gases.

Desirably, the ratio of the outer diameter of inner shell 46 to the inner diameter of outer shell 42 is from 0.5 to 0.95. Best results are obtained if the ratio of these diameters is from 0.65 to 0.9. It is possible to adjust the degree of recirculation of the gases passing through inner shell 46 by changing the diameter of baffle 56. Broadly, the inner diameter of the baffle should not be less than six inches less than the outer diameter of the after end of inner shell 46. Preferably, the ratio of the inner diameter of baffle 56 to the inner diameter of outer shell 42 should be from 0.8 to 1.

The operation of the apparatus and process of this invention is further described in connection with the following examples.

EXAMPLE I

An augmentation process was carried out in a jet engine augmenter without the recycle feature of this invention. A jet engine having the Navy Designation J-79-8 was mounted on a jet test stand and operated with full afterburner. The engine developed a thrust of 17,000 pounds. The exhaust flow was 180 pounds per second and left the afterburner at a temperature of 3,140°F.

In a first test, water at 400 gallons per minute was introduced to the cone of the exhaust stream together with 2.2 pounds of air per pound of exhaust. The mixed stream was thereby cooled to 450°F and the total flow rate leaving the augmenter was 915,000 actual cubic feet per minute.

In a second test the spray of water introduced to the jet exhaust was increased to 1,000 gallons per minute. The temperature of the mixed stream was thereby reduced to 185°F. In the second test, the actual flow of mixed and cooled exhausts, augmentation air and vaporized water was 775,000 actual cubic feet per minute.

EXAMPLE II

The jet engine described above in Example I was operated at the same rate as in Example I. The augmentation took place, however, in an apparatus similar to that disclosed in FIG. 1. The dimensions of the first shell 34, the mixing zone, and the augmenter zone are as follows:

| | |
|---|---|
| Angle of convergence of inner face of first shell | 25° |
| Diameter of downstream end of first shell | 34" |
| Inside diameter of outer augmenter shell | 6'0" |
| Outer diameter of inner augmenter shell | 4'10" |
| Angle of divergence of inner surface of inner shell | 7° |
| Inside diameter of baffles downstream of inner shell | 4'10" |

A spray of water was introduced to the outer surface of the cone of the exhaust stream at a rate of 1000 gallons per minute, the same rate as in the second test of Example I. Augmentation air at a rate of about 0.45 times that of the initial exhaust stream was introduced through the annular zone between the engine and the first shell. The resulting mixture of engine exhaust, augmentation air and vaporized water leaving the augmenter zone was at a temperature of 185°F, i.e. close to the cooled exhaust temperature in the second test of Example I. The total flow of gases leaving the augmenter was 468,000 actual cubic feet per minute as compared with 775,000 actual cubic feet per minute in Example I. The ratio of recycled, partially cooled exhaust gases to the total stream passing through the inner shell of the augmenter was 2:5, i.e., 40% of the total gases leaving the augmenter were recycled.

It can thus be seen that the total flow of exhaust gases leaving the augmenter of the present invention was about 60% that of the total flow of exhaust gases leaving the conventional augmenter operating under similar process conditions but without the recycle of partially cooled exhaust gases.

What is claimed is:

1. A process for treating the hot exhaust gases from a jet engine mounted on a test stand comprising the steps of: introducing water to said exhaust gas in a mixing zone together with augmentation air; passing the mixture formed through an augmentation zone; and recycling a portion thereof back to the said mixing zone.

2. A process as recited in claim 1 wherein a second quantity of water is introduced into the gas passing through the said augmentation zone.

3. A process as recited in claim 1 wherein the gas from said augmentation zone is passed to a gas scrubbing zone for removal of pollutants therein.

4. A process for treating the hot exhaust gases from a jet engine mounted on a test stand comprising the steps of: introducing the hot exhaust stream into the converging section of a first shell open to the atmosphere at its upstream end and thereby inducing a flow of air into said first shell; introducing water to the mixture of said hot exhaust stream and induced air, in a mixing zone at the downstream end of said first shell; and then passing the mixture of exhaust gas, induced air and water into an augmenter zone comprising a tubular outer shell and a substantially concentric tubular inner shell shorter in length than said outer shell, said inner shell having an inner surface diverging outwardly from and along the central axis common to said tubular shells, whereby a portion of said mixture is recycled through the annular space between said shells to said mixing zone.

5. A process as recited in claim 4 wherein the water is supplied uniformly and radially inwardly into the mixture of exhaust and induced air at an angle of from 0° to 30° downstream from the vertical.

6. A process as recited in claim 5 wherein the water is supplied at a velocity of from 20 to 200 feet per second.

7. A process as recited in claim 4 wherein supplementary water is supplied into the mixture passing through said inner tubular shell.

8. A process as recited in claim 4 wherein the angle of divergence of the inner surface of said inner tubular shell from said central axis is from 4° to 15°.

9. A process as recited in claim 4 wherein the angle of convergence of the inner surfaces of said first shell is from 15° to 45° and the diameter of the downsream end is from 1 inch to 15 inches greater than the maximum flame diameter of the jet engine exhaust.

10. A process as recited in claim 4 wherein an annular baffle is affixed, at its outer circumference, to the inner surface of said tubular outer shell at a position downstream of said tubular inner shell, in order to provide additional recycling of the mixture of exhaust gas, induced air and water.

11. An apparatus for treating the hot exhaust gases from a jet engine mounted on a test stand comprising the elements of: a converging section of a first shell; a jet engine positioned so that its exhaust is axially directed into said converging section thereby providing an annular air induction zone between said engine and the inner surfaces of said first shell; an outer tubular shell extending rearwardly from the outer circumference of said first shell; water supply means positioned within said outer tubular shell downstream of said first shell; and an inner tubular shell shorter in overall length than said outer tubular shell and positioned downstream of said water supply means and in substantially annular relation to said outer tubular shell, said inner tubular shell having an inner surface diverging outwardly from and along the central axis common to said tubular shells.

12. An apparatus as recited in claim 11 wherein said outer shell is cylindrical.

13. The apparatus of claim 11 wherein said water supply means are radially and uniformly positioned around the stream of jet engine exhaust and induced air passing through the downstream end of said first shell.

14. The apparatus of claim 13 wherein said spray means comprises a circular pipe having uniformly spaced holes drilled in the inner circumference thereof at angles of from 0° to 30° downstream from the vertical.

15. The apparatus of claim 13 wherein said spray means comprise uniformly spaced nozzles oriented at from 0° to 30° downstream from the vertical.

16. The apparatus of claim 11 wherein said inner tubular shell has water spray means associated with its inner surface.

17. The apparatus of claim 11 wherein the angle of divergence of the inner surface of said inner tubular shell from the central axis is from 4° to 15°.

18. An apparatus as recited in claim 11 wherein the angle of convergence of the inner surfaces of said first shell is from 15° to 45° and the diameter of the downstream end is from 1 inch to 15 inches greater than the maximum flame diameter of the jet engine exhaust.

19. An apparatus as recited in claim 11 having an annular baffle affixed at its outer circumference to the inner surface of said outer tubular shell at a position downstream of said tubular shell.

20. The apparatus of claim 19 wherein the ratio of the inner diameter of said baffle to the inner diameter of said outer tubular shell is from 0.8 to 1.0.

21. A jet engine exhaust augmentation unit comprising a longitudinally extending augmentation tube having an inlet for receiving the exhaust from a jet engine and an outlet, recycling means for returning a portion of the exhaust from the augmentation tube outlet for reintroduction into the inlet thereof for combination with the jet engine exhaust, and a water injection system for injecting water into the jet engine exhaust for lowering the temperature of the exhaust out of the augmentation tube outlet.

22. A jet engine exhaust augmentation unit according to claim 21 wherein the recycling means comprises a return shroud having a forward coupling for close coupling a jet engine thereto in alignment with the augmentation tube.

23. A jet engine exhaust augmentation unit according to claim 22 wherein the forward coupling provides for introducing secondary augmentation air around the jet engine into the inlet of the augmentation tube.

24. A jet engine exhaust augmentation unit according to claim 21 further comprising augmentation air inlet means for introducing augmentation air into the inlet of the augmentation tube for combination with the jet engine exhaust.

25. A jet engine exhaust augmentation unit according to claim 24 wherein the total mass flow rate of the additional fluid introduced into the augmentation tube inlet is no less than the mass flow rate of the jet engine exhaust.

26. A jet engine exhaust augmentation unit according to claim 21 further comprising a rear discharge conduit having a forward inlet opening in alignment with the augmentation tube for discharging from the augmentation unit the remainder of the exhaust from the augmentation tube outlet.

27. A jet engine exhaust augmentation unit according to claim 26 wherein the augmentation tube comprises a rear divergent nozzle section with a rear outlet opening in alignment with the discharge conduit inlet opening.

28. A jet engine exhaust augmentation unit according to claim 27 wherein the rear outlet opening of the divergent nozzle section is larger than and is spaced forwardly of the forward inlet opening of the discharge conduit.

29. A jet engine exhaust augmentation unit according to claim 28 wherein the recycling means comprises an annular concave deflector for substantially reversing the flow of said returned portion of the exhaust from the augmentation tube outlet.

30. A jet engine exhaust augmentation unit according to claim 21 wherein the water injection system provides for injecting sufficient water to reduce the temperature of the jet engine exhaust out the augmentation tube outlet to approximately 212°F.

31. A jet engine exhaust augmentation unit according to claim 21 wherein the water injection system provides for injecting water into the augmentation tube for lowering the temperature of the jet engine exhaust.

32. A jet engine exhaust augmentation unit according to claim 21 wherein the water injection system provides for injecting water into said returned portion of the exhaust as it is returned for reintroduction to the tube inlet.

33. A turbojet engine exhaust augmentation unit for a turbojet engine test cell comprising a housing with an elongated shroud having a forward opening for receiving a turbojet engine and a rear discharge conduit with a forward inlet opening substantially larger than and in alignment with the rear exhaust opening of the turbojet engine, an elongated augmentation nozzle mounted within the shroud intermediate of and in alignment with the turbojet engine and discharge conduit and having a forward inlet opening for receiving the turbojet engine exhaust and a rear divergent nozzle section with a rear outlet opening in alignment with and forwardly of the discharge conduit inlet opening, the augmentation nozzle forming with the elongated shroud a substantially annular recirculating passage around the nozzle for returning a portion of the exhaust from the rear outlet opening of the nozzle to its forward inlet opening, and water injection means for injecting water into the engine exhaust for lowering the temperature of the exhaust out the rear nozzle outlet opening, the augmentaion nozzle being dimensioned so that the engine exhaust flow through the nozzle provides for drawing said returned exhaust portion into the nozzle inlet opening for augmentation of the engine exhaust.

34. A method of augmenting jet engine exhaust in a jet engine test cell for reducing the exhaust temperature and noise, comprising the steps of returning a portion of the jet exhaust from a relative downstream point for aspiration into the jet engine exhaust at a relative upstream point for augmentation of the exhaust, and injecting water into the jet exhaust to form an exhaust and water mixture for cooling the exhaust and vaporizing the water at least in part and such that a jet exhaust and water mixture is aspirated into the jet exhaust at said relative upstream point.

35. A method of augmenting jet engine exhaust in a jet engine test cell according to claim 34 further comprising the step of aspirating augmentation air into the jet engine exhaust at a mass flow rate substantially less than the mass flow rate of the exhaust and water mixture aspirated into the jet engine exhaust.

* * * * *

UNITED STATES PATENT AND TRADEMARK OFFICE
CERTIFICATE OF CORRECTION

PATENT NO. : 3,899,923
DATED : August 19, 1975
INVENTOR(S) : Aaron J. Teller

It is certified that error appears in the above-identified patent and that said Letters Patent are hereby corrected as shown below:

Col. 4, line 43 - before "end" insert -- downstream --.

Col. 4, line 61 - "is it" should be -- it is --.

Col. 6, line 50 - after "was" insert -- about --; after "i.e.," insert -- about --.

Col. 7, line 36, claim 9 - "downsream" should be -- downstream --.

Col. 8, line 23, claim 19 - after "said" insert -- inner --.

Signed and Sealed this thirtieth Day of December 1975

[SEAL]

Attest:

RUTH C. MASON
Attesting Officer

C. MARSHALL DANN
Commissioner of Patents and Trademarks